United States Patent
Patel et al.

(10) Patent No.: US 10,901,641 B2
(45) Date of Patent: Jan. 26, 2021

(54) METHOD AND SYSTEM FOR INLINE DEDUPLICATION

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 16/260,635

(22) Filed: Jan. 29, 2019

(65) Prior Publication Data
US 2020/0241779 A1    Jul. 30, 2020

(51) Int. Cl.
| G06F 3/06 | (2006.01) |
| G06F 11/14 | (2006.01) |
| G06F 16/174 | (2019.01) |
| G06F 16/27 | (2019.01) |

(52) U.S. Cl.
CPC ............ *G06F 3/0641* (2013.01); *G06F 3/065* (2013.01); *G06F 3/0608* (2013.01); *G06F 3/0673* (2013.01); *G06F 11/1453* (2013.01); *G06F 16/1748* (2019.01); *G06F 16/27* (2019.01)

(58) Field of Classification Search
CPC .............. G06F 3/0641; G06F 16/1748; G06F 16/1744; G06F 3/065; G06F 16/1752; G06F 11/1453; G06F 16/27
See application file for complete search history.

(56) References Cited

U.S. PATENT DOCUMENTS

| 4,780,809 A | 10/1988 | Woffinden et al. |
| 6,098,098 A | 8/2000 | Sandahl et al. |
| 7,636,814 B1 | 12/2009 | Karr et al. |
| 7,987,353 B2 | 7/2011 | Holdaway et al. |
| 8,099,571 B1 | 1/2012 | Driscoll et al. |
| 8,161,255 B2 | 4/2012 | Anglin et al. |
| 8,190,835 B1 | 5/2012 | Yueh |
| 8,364,917 B2 | 1/2013 | Bricker et al. |
| 8,386,930 B2 | 2/2013 | Dillenberger et al. |
| 8,583,769 B1 | 11/2013 | Peters et al. |
| 8,788,466 B2 | 7/2014 | Anglin et al. |
| 8,868,987 B2 | 10/2014 | Wagner |
| 8,874,892 B1 | 10/2014 | Chan et al. |

(Continued)

OTHER PUBLICATIONS

"Features—RoboHead"; Project Management Software for Marketing & Creative Teams, Aquent; 2018 (https://www.robohead.net/features).

(Continued)

*Primary Examiner* — Ernest Unelus
(74) *Attorney, Agent, or Firm* — Chamberlain, Hrdlicka, White, Williams & Aughtry

(57) ABSTRACT

A method for storing data includes receiving, by a data cluster, a request to store data from a host, deduplicating, by the data cluster, the data to obtain deduplicated data on a first data node, replicating the deduplicated data to generate a plurality of replicas, and storing a first replica of the plurality of replicas on a second data node and a second replica of the plurality of replicas on a third data node, wherein the first data node, the second data node and the third data node are in the data cluster.

7 Claims, 12 Drawing Sheets

(56) References Cited

U.S. PATENT DOCUMENTS

| | | |
|---|---|---|
| 8,898,114 B1 | 11/2014 | Feathergill et al. |
| 8,949,208 B1 | 2/2015 | Xu et al. |
| 9,122,501 B1 | 9/2015 | Hsu et al. |
| 9,201,751 B1 | 12/2015 | Muthirisavenugopal |
| 9,278,481 B2 | 3/2016 | Hull |
| 9,355,036 B2 | 5/2016 | Beard et al. |
| 9,521,198 B1 | 12/2016 | Agarwala et al. |
| 9,710,367 B1 | 7/2017 | Nagineni |
| 9,749,480 B1 | 8/2017 | Katano |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,185,624 B2 | 1/2019 | Akutsu et al. |
| 10,241,695 B2 | 3/2019 | Baptist et al. |
| 10,339,455 B1 | 7/2019 | Parush-tzur |
| 10,409,778 B1 | 9/2019 | Zhao et al. |
| 10,503,413 B1 | 12/2019 | Gal et al. |
| 10,503,611 B1 | 12/2019 | Srivastav et al. |
| 2001/0044879 A1 | 11/2001 | Moulton et al. |
| 2003/0058277 A1 | 3/2003 | Bowman-Amuah |
| 2003/0172145 A1 | 9/2003 | Nguyen |
| 2003/0177205 A1 | 9/2003 | Liang et al. |
| 2004/0128587 A1 | 7/2004 | Kenchammana-Hosekote et al. |
| 2005/0076049 A1 | 4/2005 | Qubti et al. |
| 2007/0283011 A1 | 12/2007 | Rakowski et al. |
| 2008/0244204 A1 | 10/2008 | Cremelie et al. |
| 2009/0077165 A1 | 3/2009 | Rhodes et al. |
| 2009/0094250 A1 | 4/2009 | Dhuse et al. |
| 2009/0265360 A1 | 10/2009 | Bachwani et al. |
| 2011/0099351 A1 | 4/2011 | Condict |
| 2011/0246597 A1 | 10/2011 | Swanson et al. |
| 2013/0067459 A1 | 3/2013 | Sannidhanam et al. |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0297603 A1* | 10/2014 | Kim ................. G06F 16/1752 707/692 |
| 2015/0058582 A1 | 2/2015 | Baldwin et al. |
| 2015/0161000 A1 | 6/2015 | Kim et al. |
| 2015/0220400 A1 | 8/2015 | Resch et al. |
| 2015/0355980 A1 | 12/2015 | Volvovski et al. |
| 2016/0062674 A1 | 3/2016 | Benight et al. |
| 2016/0085630 A1 | 3/2016 | Gardner |
| 2016/0246537 A1 | 8/2016 | Kim |
| 2017/0099187 A1 | 4/2017 | Dale et al. |
| 2017/0160983 A1 | 6/2017 | Fiske et al. |
| 2017/0192868 A1 | 7/2017 | Vijayan et al. |
| 2017/0206034 A1 | 7/2017 | Fetik |
| 2017/0235609 A1 | 8/2017 | Wires et al. |
| 2018/0018235 A1 | 1/2018 | Arslan et al. |
| 2018/0060894 A1 | 3/2018 | Beveridge et al. |
| 2018/0157532 A1 | 6/2018 | Kumar et al. |
| 2018/0189109 A1 | 7/2018 | Nagai et al. |
| 2018/0278597 A1 | 9/2018 | Helms et al. |
| 2018/0307560 A1 | 10/2018 | Vishnumolakala et al. |
| 2018/0322558 A1 | 11/2018 | Padmanabh et al. |
| 2019/0104398 A1 | 4/2019 | Owen et al. |
| 2019/0109772 A1 | 4/2019 | Lipstone et al. |
| 2019/0197023 A1 | 6/2019 | Chennamsetty et al. |
| 2019/0332473 A1 | 10/2019 | Yang et al. |
| 2019/0379588 A1* | 12/2019 | Rao ....................... H04L 47/125 |
| 2020/0050689 A1 | 2/2020 | Tal et al. |

OTHER PUBLICATIONS

"Make more time for the work that matters most"; Asana, Inc.; 2017 (https://asana.com/).

"Online Project Management Tools & Features"; ProWorkflow; Jun. 2015 (https://www.proworkflow.com/features-project-management-tools/).

Suzhen Wu et al. ;"Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028).

"Features—RoboHead"; Project Management Software for Marketing & Creative Teams, Aquent; 2018 (https://www.robohead.net/features) (7 pages).

"Make more time for the work that matters most"; Asana, Inc.; 2017 (https://asana.com/) (5 pages).

"Online Project Management Tools & Features"; ProWorkflow; Jun. 2015 (https://www.proworkflow.com/features-project-management-tools/) (2 pages).

Extended European Search Report issued in corresponding European Application No. 20152194.5, dated Jun. 29 2020.

Extended European Search Report issued in corresponding European Application No. 20152195.2, dated Jun. 2, 2020.

* cited by examiner

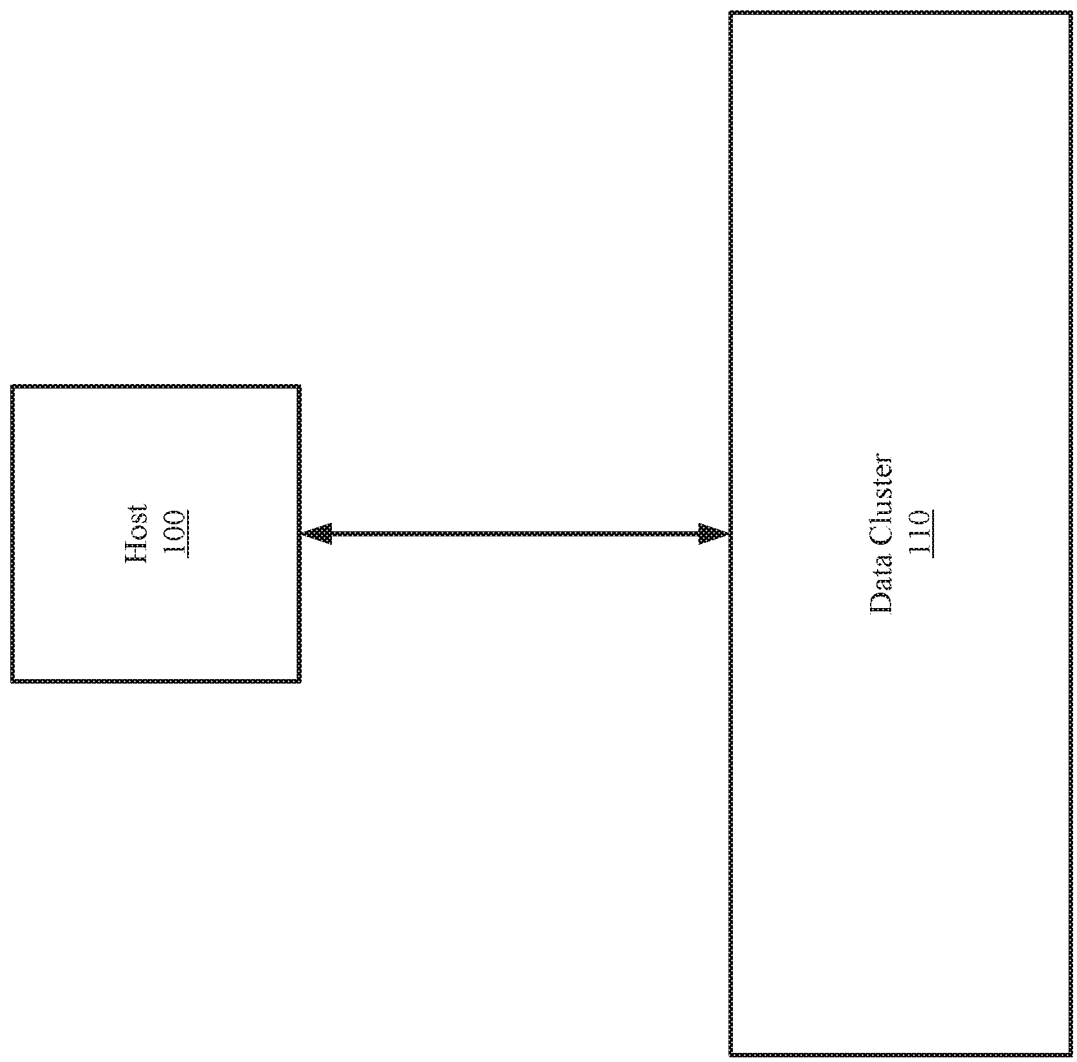

METHOD AND SYSTEM FOR INLINE DEDUPLICATION

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method for storing data. The method includes receiving, by a data cluster, a request to store data from a host, deduplicating, by the data cluster, the data to obtain deduplicated data on a first data node, replicating the deduplicated data to generate a plurality of replicas, and storing a first replica of the plurality of replicas on a second data node and a second replica of the plurality of replicas on a third data node, wherein the first data node, the second data node and the third data node are in the data cluster.

In one aspect, non-transitory computer readable medium comprising computer readable program code, which when executed by a computer processor enables the computer processor to perform a method for generating data. The method includes receiving, by a data cluster, a request to store data from a host, deduplicating, by the data cluster, the data to obtain deduplicated data on a first data node, replicating the deduplicated data to generate a plurality of replicas, and storing a first replica of the plurality of replicas on a second data node and a second replica of the plurality of replicas on a third data node, wherein the first data node, the second data node and the third data node are in the data cluster.

In one aspect, a data cluster in accordance with one or more embodiments of the invention includes a plurality of data nodes comprising a first data node, a second data node, and a third data node, wherein the first data node of the plurality node is programmed to receive a request to store data from a host, deduplicate the data to obtain deduplicated data, replicate the deduplicated data to generate a plurality of replicas, and initiate the storage of a first replica of the plurality of replicas on the second data node of the plurality of nodes and a second replica of the plurality of replicas on the third data node of the plurality of nodes.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1A shows a diagram of a system in accordance with one or more embodiments of the invention.

DETAILED DESCRIPTION

Figure 1B:
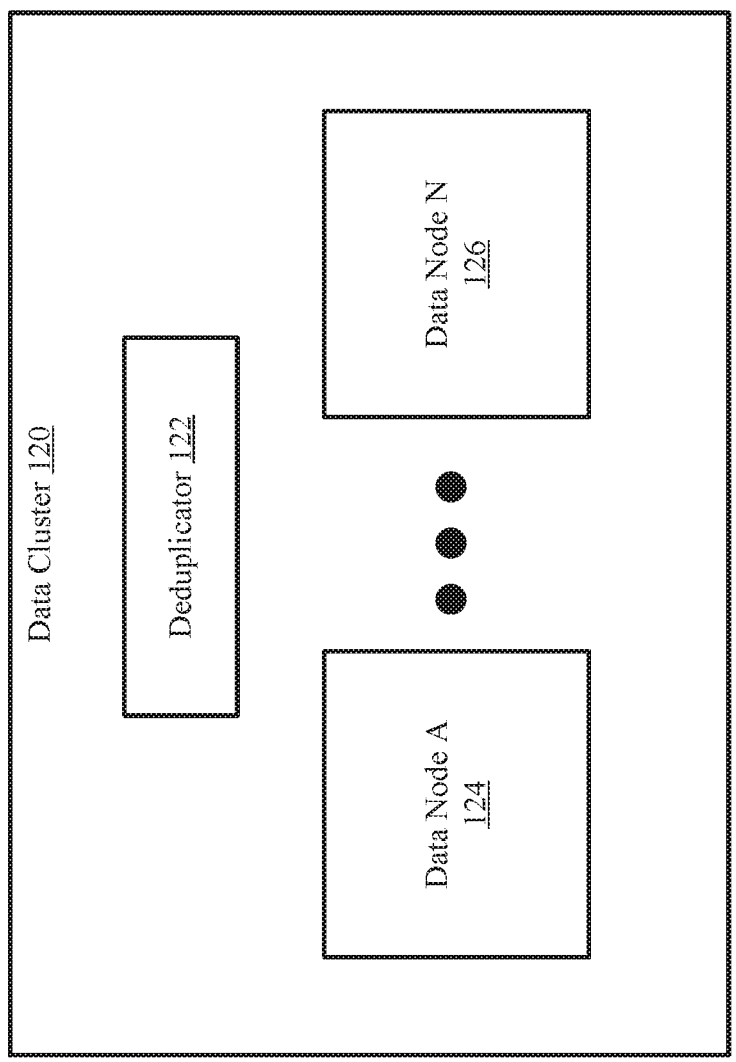
FIG. 1B shows a diagram of a first data cluster in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing data in a data cluster. Embodiments of the invention may utilize a deduplicator that performs deduplication on data obtained from a host to generate deduplicated data. In one or more embodiments of the invention, the deduplicated data is subsequently replicated to other nodes in the data cluster. Embodiments of the invention may include sending a confirmation to the host that the obtained data is deduplicated and stored in the data cluster.

FIG. 1A shows an example system in accordance with one or more embodiments of the invention. The system includes a host (100) and a data cluster (110). The host (100) is operably connected to the data cluster (110) via any combination of wired and/or wireless connections.

In one or more embodiments of the invention, the host (100) utilizes the data cluster (110) to store data. The data stored may be, for example, backups of databases, files, applications, and/or other types of data without departing from the invention.

Figure 4:
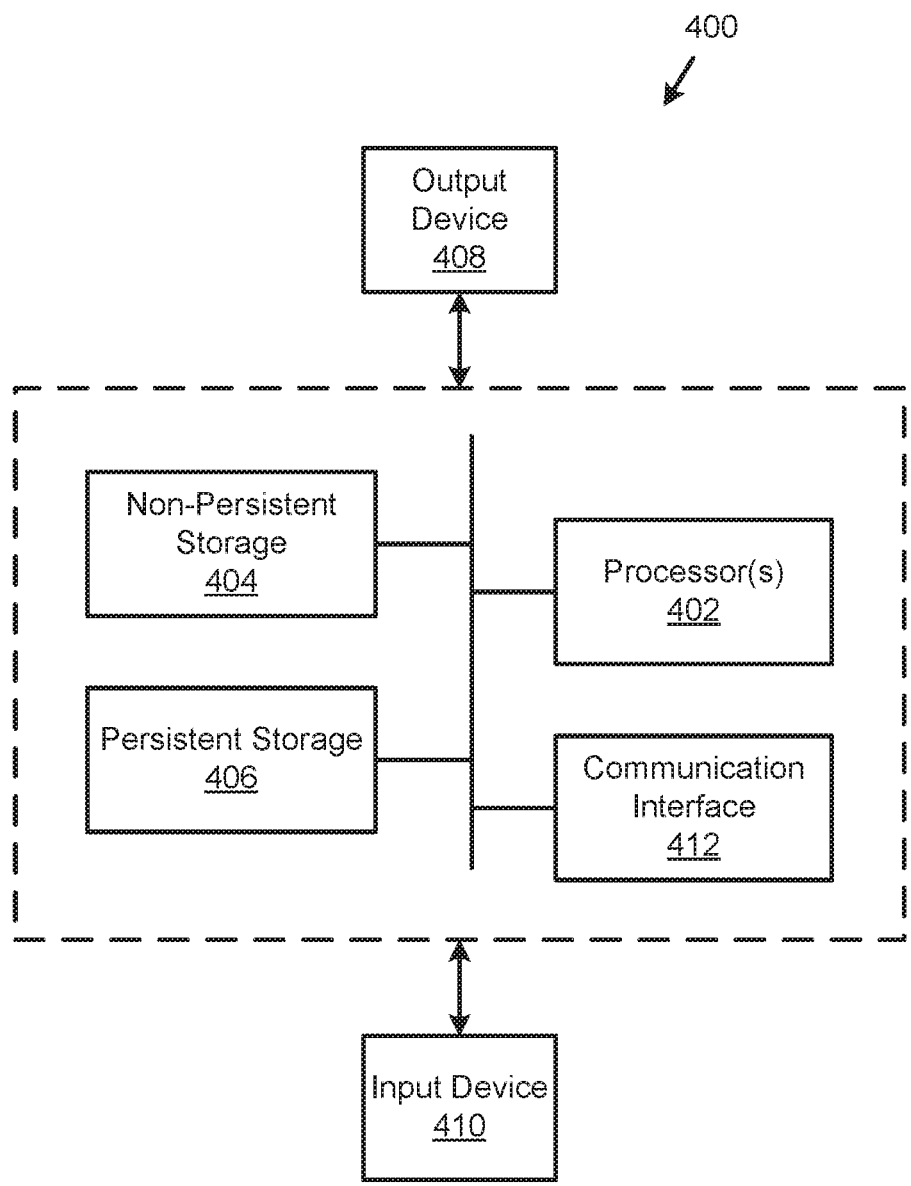
FIG. 4 shows a diagram of a computing device in accordance with one or more embodiments of the invention.

In one or more embodiments of the invention, the host (100) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data and/or backups of data generated by the host (100). The data and/or backups of data may be deduplicated versions of data obtained from the host. The data cluster may replicate the deduplicated versions of the data (also referred to as deduplicated data) to nodes operating in the data cluster (110).

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

Continuing with the discussion of FIG. 1A, the data cluster (110) may include nodes that each store any number of deduplicated data. The data may be obtained by other nodes (through replications) or obtained from the host (100). For additional details regarding the data cluster (110), see, e.g., FIGS. 1B and 1C.

FIG. 1B shows a diagram of a data cluster (120) in accordance with one or more embodiments of the invention. The data cluster (120) may be an embodiment of the data cluster (110, FIG. 1A) discussed above. The data cluster (120) may include a deduplicator (122) and any number of data nodes (124, 126). The components of the data cluster (120) may be operably connected via any combination of wired and/or wireless connections. Each of the aforementioned components is discussed below.

In one or more embodiments of the invention, the deduplicator(s) (122) is a device (physical or logical) that includes functionality to perform deduplication on data obtained from a host (e.g., 100, FIG. 1A). The deduplicator (122) may store information useful to perform the aforementioned functionality. The information may include deduplication identifiers (D-IDs). A D-ID is a unique identifier that identifies portions of data (e.g., segments) that are stored in the data cluster (120). The D-ID may be used to determine whether a data segment of obtained data is already present elsewhere in the data cluster (120). The deduplicator (122) may use the information to perform the deduplication on the obtained data to generate deduplicated data. After deduplication, the deduplicated data may be replicated to the data nodes (124, 126) a predetermined number of times. The deduplicator (122) may perform the deduplication/replication via the method illustrated in FIG. 2A.

Figure 2A:
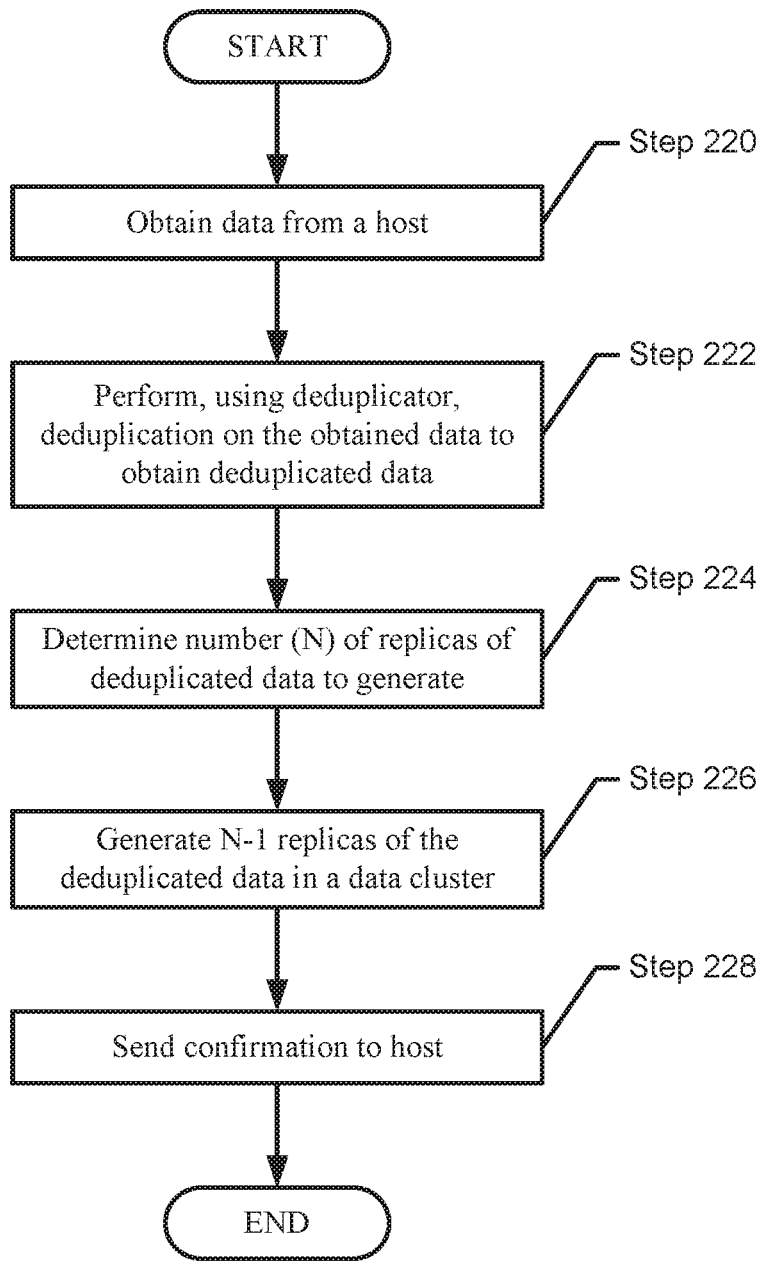
FIG. 2A shows a flowchart for storing data in a data cluster in accordance with one or more embodiments of the invention.

In one or more of embodiments of the invention, the deduplicator (122) is implemented as computer instructions, e.g., computer code, stored on a persistent storage that when executed by a processor of a data node (e.g., 124, 126) cause the data node to provide the aforementioned functionality of the deduplicator (122) described throughout this application and/or all, or a portion thereof, of the method illustrated in FIG. 2A.

In one or more embodiments of the invention, the deduplicator (122) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the deduplicator (122) described throughout this application and/or all, or a portion thereof, of the method illustrated in FIG. 2A.

In one or more embodiments of the invention, the deduplicator (122) is implemented as a logical device. The logical device may utilize the computing resources of any number of computing devices and thereby provide the functionality of the deduplicator (122) described throughout this application and/or all, or a portion thereof, of the method illustrated in FIG. 2A.

In one or more embodiments of the invention, the data nodes (124, 126) are devices that store deduplicated data. The data nodes (124, 126) may include persistent storage that may be used to store the deduplicated data.

In one or more embodiments of the invention, each data node (124, 126) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data node (124, 126) described throughout this application and/or all, or a portion thereof, of the method illustrated in FIG. 2A.

In one or more embodiments of the invention, the data nodes (124, 126) are implemented as a logical device. The logical device may utilize the computing resources of any number of computing devices and thereby provide the functionality of the data nodes (124, 126) described throughout this application and/or all, or a portion thereof, of the method illustrated in FIG. 2B.

Figure 1C:
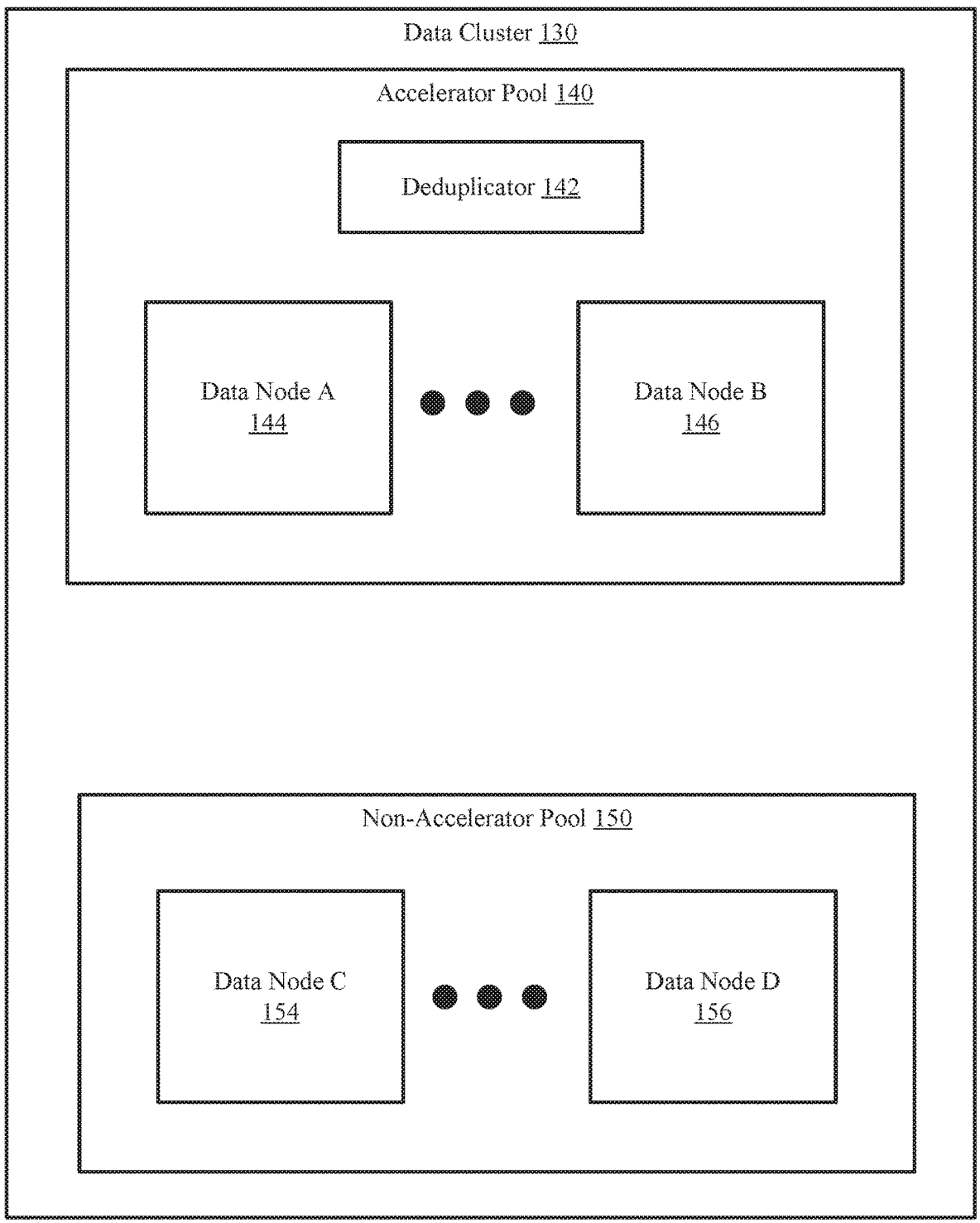
FIG. 1C shows a diagram of another data cluster in accordance with one or more embodiments of the invention.

FIG. 1C shows a diagram of another example data cluster (130) in accordance with one or more embodiments of the invention. The data cluster (130) may be an embodiment of the data cluster (110, FIG. 1A) discussed above. The data cluster (130) may include an accelerator pool (140) and a non-accelerator pool (150). The accelerator pool (140) may include a deduplicator(s) (142) and any number of data nodes (144, 146). Similarly, the non-accelerator pool (150) includes any number of data nodes (154, 156). The components of the data cluster (130) may be operably connected via any combination of wired and/or wireless connections. Each of the aforementioned components is discussed below.

In one or more embodiments of the invention, the deduplicator (142) is a device that includes functionality to perform deduplication on data obtained from a host (e.g., 100, FIG. 1A). The deduplicator (142) may store information useful to perform the aforementioned functionality. The information may include deduplication identifiers (D-IDs). A D-ID is a unique identifier that identifies portions of the data (e.g., segments) that are stored in the data cluster (130). The D-ID may be used to determine whether a data segment of obtained data is already present elsewhere in the accelerator pool (140) or the non-accelerator pool (150). The deduplicator (142) may use the information to perform the deduplication and generate deduplicated data. After deduplication, the deduplicated data may be replicated to the non-accelerated pool (150) a predetermined number of times. The deduplicator (142) may perform the deduplication/replication via the method illustrated in FIG. 3A.

Figure 3A:
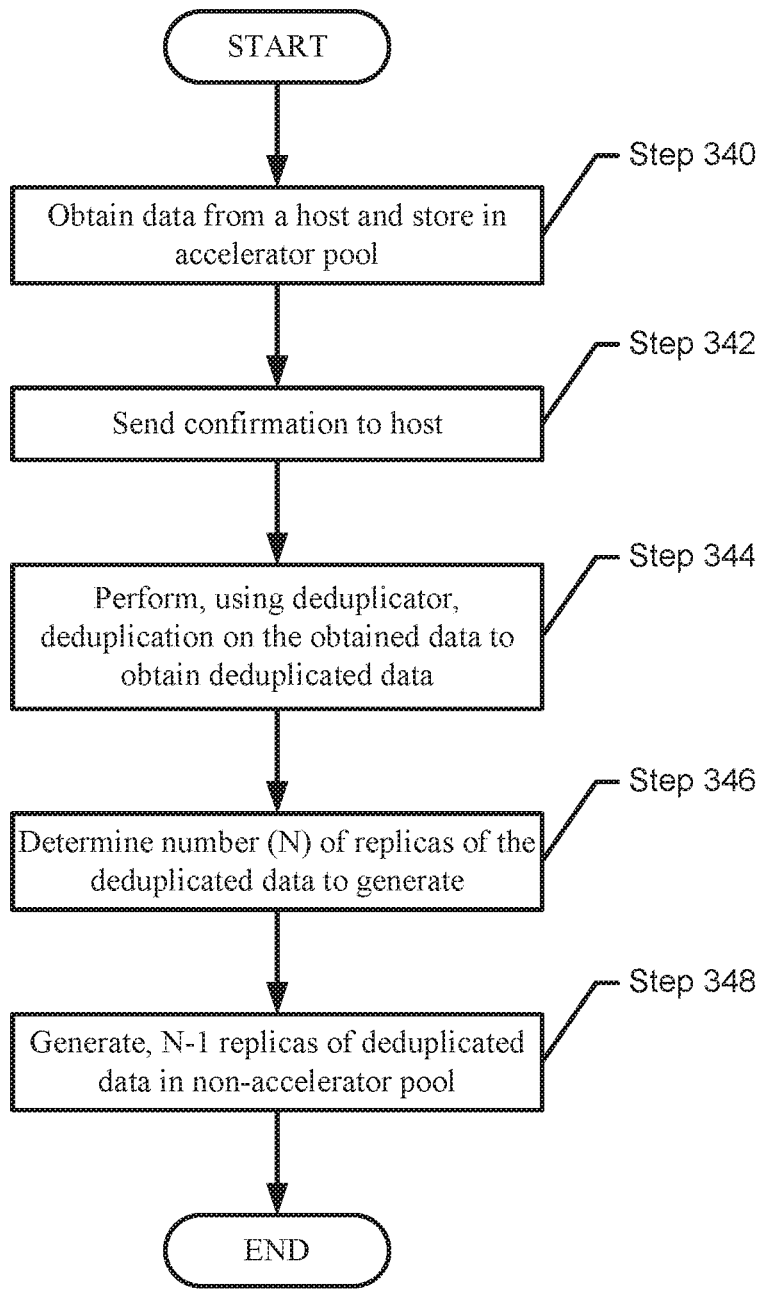
FIG. 3A shows a flowchart for storing data in a data cluster in accordance with one or more embodiments of the invention.

In one or more of embodiments of the invention, the deduplicator (142) is implemented as computer instructions, e.g., computer code, stored on a persistent storage that when executed by a processor of a data node (e.g., 144, 146) of the accelerator pool (140) cause the data node to provide the aforementioned functionality of the deduplicator (142) described throughout this application and/or all, or a portion thereof, of the method illustrated in FIG. 3A.

In one or more embodiments of the invention, the deduplicator (142) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the deduplicator (142) described throughout this application and/or all, or a portion thereof, of the method illustrated in FIG. 3A.

In one or more embodiments of the invention, the deduplicator (142) is implemented as a logical device. The logical device may utilize the computing resources of any number of computing devices and thereby provide the functionality of the deduplicator (142) described throughout this application and/or all, or a portion thereof, of the method illustrated in FIG. 3A.

Continuing with the discussion of FIG. 1C, different data nodes in the cluster may include different quantities and/or types of computing resources, e.g., processors providing processing resources, memory providing memory resources, storages providing storage resources, communicators providing communications resources. Thus, the system may include a heterogeneous population of nodes.

The heterogeneous population of nodes may be logically divided into an accelerator pool (140) including nodes that have more computing resources, e.g., high performance nodes (144, 146) than other nodes and a non-accelerator pool (150) including nodes that have fewer computing resources, e.g., low performance nodes (154, 156) than the nodes in the accelerator pool (140). For example, nodes of the accelerator pool (140) may include enterprise class solid state storage resources that provide very high storage bandwidth, low latency, and high input-outputs per second (IOPS). In contrast, the nodes of the non-accelerator pool (150) may include hard disk drives that provide lower storage performance. While illustrated in FIG. 1C as being divided into two groups, the nodes may be divided into any number of groupings based on the relative performance level of each node without departing from the invention.

In one or more embodiments of the invention, the data nodes (144, 146, 154, 156) are devices that store deduplicated data. The data nodes (144, 146, 154, 156) may include persistent storage that may be used to store the deduplicated data.

In one or more embodiments of the invention, the non-accelerator pool (150) includes any number of fault domains. In one or more embodiments of the invention, a fault domain is a logical grouping of nodes (e.g., data nodes) that, when one node of the logical grouping of nodes goes offline and/or otherwise becomes inaccessible, the other nodes in the logical grouping of nodes are directly affected. The effect of the node going offline to the other nodes may include the other nodes also going offline and/or otherwise inaccessible. The non-accelerator pool (150) may include multiple fault domains. In this manner, the events of one fault domain in the non-accelerator pool (150) may have no effect to other fault domains in the non-accelerator pool (150).

For example, two data nodes may be in a first fault domain. If one of these data nodes in the first fault domain experiences an unexpected shutdown, other nodes in the first fault domain may be affected. In contrast, another data node in the second fault domain may not be affected by the unexpected shutdown of a data node in the first fault domain. In one or more embodiments of the invention, the unexpected shutdown of one fault domain does not affect the nodes of other fault domains. In this manner, data may be replicated and stored across multiple fault domains to allow high availability of the data.

In one or more embodiments of the invention, each data node (144, 146, 154, 156) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data node (144, 146, 154, 156) described throughout this application and/or all, or a portion thereof, of the method illustrated in FIG. 3A.

In one or more embodiments of the invention, the data nodes (144, 146, 154, 156) are implemented as a logical device. The logical device may utilize the computing resources of any number of computing devices and thereby provide the functionality of the data nodes (144, 146, 154, 156) described throughout this application and/or all, or a portion thereof, of the method illustrated in FIG. 3A.

FIG. 2A shows a flowchart for storing data in a data cluster in accordance with one or more embodiments of the invention. The method shown in FIG. 2A may be performed by, for example, a deduplicator (122, FIG. 1B). Other components of the system illustrated in FIGS. 1A and 1B may perform the method of FIG. 2A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 2A, in step 220, data is obtained from a host. The data may be a file, a file segment, a collection of files, or any other type of data without departing from the invention. The data may include one or more data segments. The data may be obtained in response to a request to store data and/or backup the data. Other requests may be used to initiate the method without departing from the invention.

In step 222, deduplication is performed on the obtained data to obtain deduplicated data. In one or more embodiments of the invention, the deduplication is performed by identifying data segments of data in the obtained data and assigning a fingerprint to each data segment. A fingerprint is a unique identifier that may be stored in metadata of the obtained data. The deduplicator, when performing the deduplication, may generate a fingerprint for a data segment of the obtained data and identify whether the fingerprint matches an existing fingerprint stored in the deduplicator. If the fingerprint matches an existing fingerprint, the data segment associated with the data segment may be deleted, as it is already stored in the data cluster. If the fingerprint does not match any existing fingerprints, the data segment may be stored as part of the deduplicated data. Additionally, the fingerprint may be stored in the deduplicator for future use.

In one or more embodiments of the invention, the process of generating a fingerprint for a data segment of the obtained data may be repeated for all data segments in the obtained data. The process may result in the generation of deduplicated data.

In step 224, a number (N) of replicas of deduplicated data to generate is determined. In one or more embodiments of the invention, the number (N) is obtained from the host. The host may request that N replicas of the deduplicated data be stored in the data cluster. In such scenarios, step 224 may be performed whenever the number N is obtained from the host.

In one or more embodiments of the invention, the deduplicator determines the number (N) by querying the host to obtain the number (N). The number (N) may be based on a request by a user to replicate the data in the data cluster a predetermined amount of times. The user may operate a client (i.e., a computing device used by the user and operatively connected to the host) to send the request for the number of replicas to the host.

In another embodiment of the invention, the deduplicator includes information about a default number of replicas to generate.

In step 226, N−1 replicas of the deduplicated data are generated in the data cluster. In one or more embodiments of the invention, the deduplicated data generated in step 222 is the first deduplicated data of the N number of deduplicated data. The deduplicated data may be replicated N−1 more times. This results in N total deduplicated data stored in the data cluster.

In one or more embodiments of the invention, each deduplicated data generated is stored in a data node of the data cluster. The data node of deduplicated data is generated by copying the first (or another previously generated) deduplicated data. In this manner, the obtained data only has to be deduplicated once and then the resulting deduplicated data may itself be copied (i.e., replicated) to generate the remaining N−1 replicas that have been requested.

In step 228, confirmation is sent to the host. In one or more embodiments of the invention, the confirmation is an acknowledgement (ACK) that confirms either: (i) receipt of the data by the data cluster, and/or (ii) completion of the deduplication and requested replication of the data stored in the data cluster.

Example 1

Figure 2B:
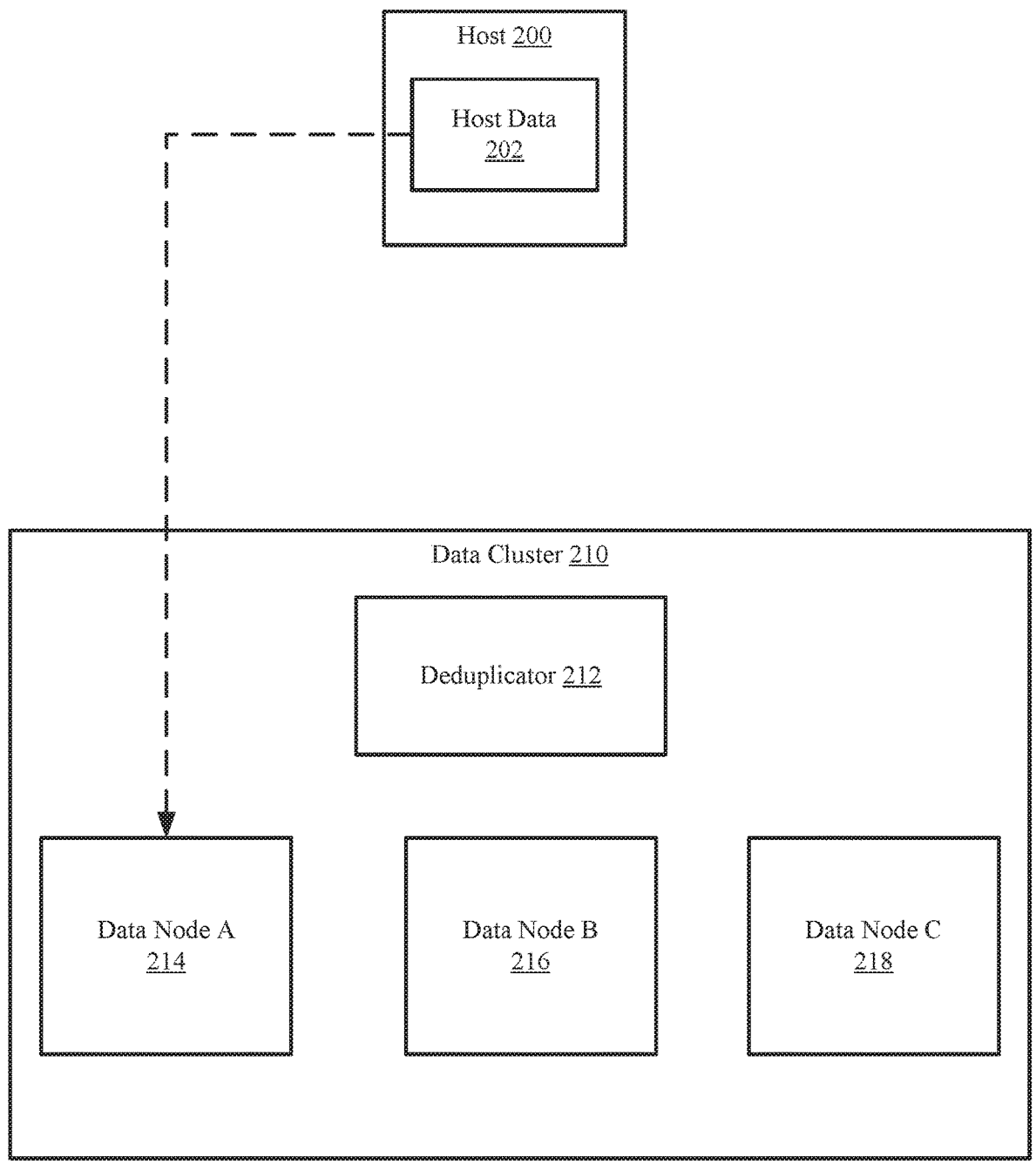
FIGS. 2B-2D show a first example in accordance with one or more embodiments of the invention.
Figure 2C:
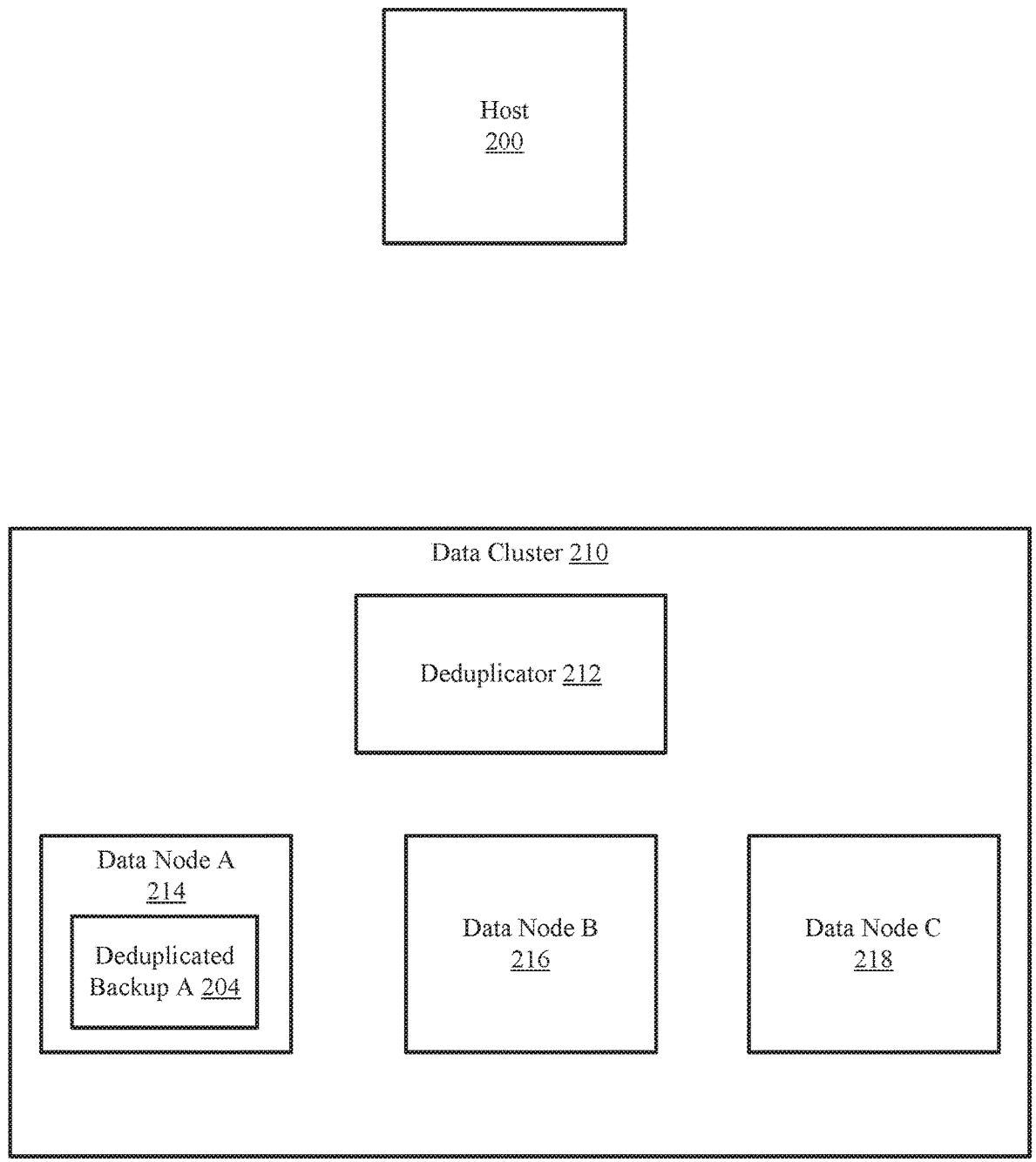
Figure 2D:
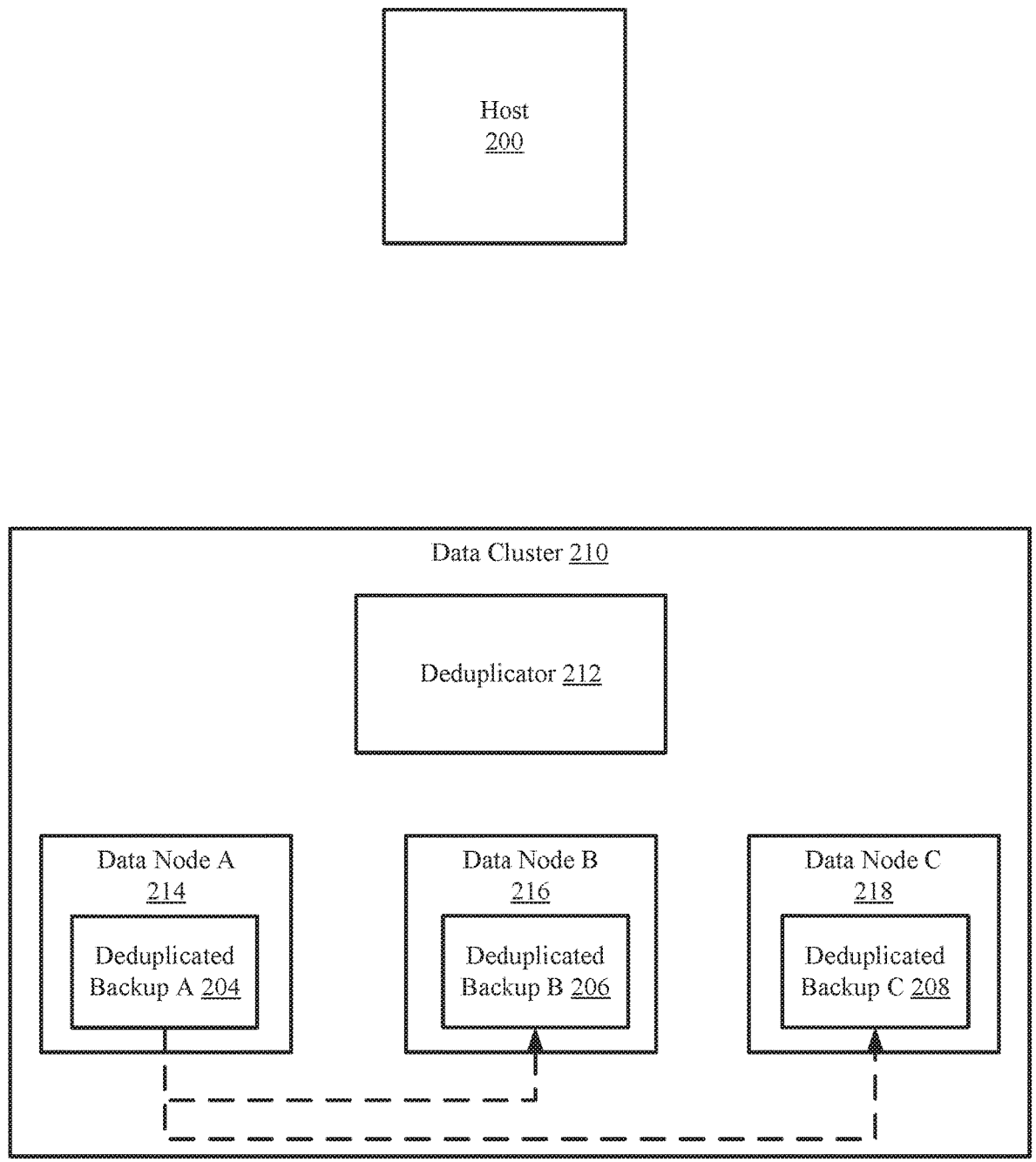

The following section describes an example. The example is not intended to limit the invention. The example is illustrated in FIGS. 2B-2D, with FIG. 2B showing an example system at a first point in time. Turning to the example, consider a scenario in which a host (200) wants to store deduplicated versions of host data (202) in a data cluster (210). The data cluster (210), which includes a deduplicator (212), obtains the host data (202) in a data node A (214) (see e.g., FIG. 2A, Step 220).

The deduplicator (212) may further perform the method of FIG. 2A to deduplicate the obtained host data (202) (see e.g., FIG. 2A, Step 222). The process of deduplicating the host data (202) may include identifying data segments in the host data (202) and generating fingerprints of each data segment. For each generated fingerprint, the deduplicator (212) may search data stored in the deduplicator (212) to determine whether the generated fingerprint matches an existing fingerprint in the deduplicator. For every generated fingerprint matching an existing fingerprint, the data segment associated with the generated fingerprint may be deleted from the deduplicator. In this manner, the result is deduplicated data with data segments not already stored in the data nodes (214, 216, 218) of the data cluster (210).

FIG. 2C shows the example system at a second point in time. At the second point in time, the data cluster (210) includes deduplicated data (204) stored in data node A (214). The deduplicator (212), continuing the method of FIG. 2A, may determine a number (N) of deduplicated data to store in the data cluster (210) (see e.g., FIG. 2A, Step 224). The number (N) may be determined based on a request from the host. The host may request that the number (N) be three. In other words, the host requests that three deduplicated data be stored in the data cluster (210).

Because one of the deduplicated data (204) is already generated in this point in time, the deduplicator may replicate the deduplicated data two more times. Data node A (214), which stores the first deduplicated data (204), may replicate the deduplicated data (204) to data nodes B and C (216, 218) in parallel. In other words, the data node (214) may generate a second deduplicated data and a third deduplicated data at the same time. The replicated data may be generated and stored serially without departing from the invention. FIG. 2D shows the example system at a third point in time. At this third point in time, deduplicated data B (206) and C (208) may be stored in data nodes B (216) and C (218), respectively (see e.g., FIG. 2A, Step 226). The deduplicator may complete performing the method of FIG. 2A by sending the confirmation of storage to the host.

End of Example 1

FIG. 3A shows a flowchart for storing data in a data cluster in accordance with one or more embodiments of the invention. The method shown in FIG. 3A may be performed by, for example, a deduplicator (142, FIG. 1C). Other components of the system illustrated in FIGS. 1A and 1C may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 340, data is obtained from a host by a node in the accelerator pool. The data may be a file, a file segment, a collection of files, or any other type of data without departing from the invention. The data may include one or more data segments.

In step 342, confirmation is sent to the host. In one or more embodiments of the invention, the confirmation is an acknowledgement (ACK) that confirms that the data processing has been completed by the data cluster. At this stage, from the perspective of the host, the data has been backed up. This is the case even though data cluster is still performing the method shown in FIG. 3A.

In step 344, deduplication is performed on the obtained data to obtain deduplicated data. In one or more embodiments of the invention, the deduplication is performed by identifying data segments of the obtained data and assigning a fingerprint to each data segment. A fingerprint is a unique identifier that may be stored in metadata of the data. The deduplicator, when performing the deduplication, may generate a fingerprint for a data segment of the obtained data and identify whether the fingerprint matches an existing fingerprint stored in the deduplicator. If the fingerprint matches an existing fingerprint, the data segment associated with the data segment may be deleted, as it is already stored in the data cluster. If the fingerprint does not match any existing fingerprints, the data segment may be stored as part of the deduplicated data. Additionally, the fingerprint may be stored in the deduplicator for future use.

In one or more embodiments of the invention, the process of generating a fingerprint for a data segment of the obtained data may be repeated for all data segments in the obtained data. The process may result in the generation of deduplicated data.

In step 346, a number (N) of replicas of deduplicated data to generate is determined. In one or more embodiments of the invention, the number (N) is obtained from the host. The host may request that N replicas of the deduplicated data be stored in the data cluster. In such scenarios, step 346 may be performed whenever the number N is obtained from the host.

In one or more embodiments of the invention, the deduplicator determines the number (N) by querying the host to obtain the number (N). The number (N) may be based on a request by a user to replicate the data in the data cluster a predetermined amount of times. The user may operate a client (i.e., a computing device used by the user and operatively connected to the host) to send the request for the number of replicas to the host.

In another embodiment of the invention, the deduplicator includes information about a default number of replicas to generate.

In step 348, N−1 replicas of the deduplicated data are generated and stored in the non-accelerator pool. In one or more embodiments of the invention, the deduplicated data generated in step 344 is the first deduplicated data of the N number of deduplicated data. The deduplicated data may be replicated N−1 more times. This results in N total deduplicated data stored in the data cluster.

In one or more embodiments of the invention, each deduplicated data generated is stored in a data node in the non-accelerator pool. In one implementation, each of the aforementioned data nodes in the non-accelerator pool is in its own fault domain. In this manner, the deduplicated data may be stored across multiple fault domains in the non-accelerated pool.

Example 2

Figure 3B:
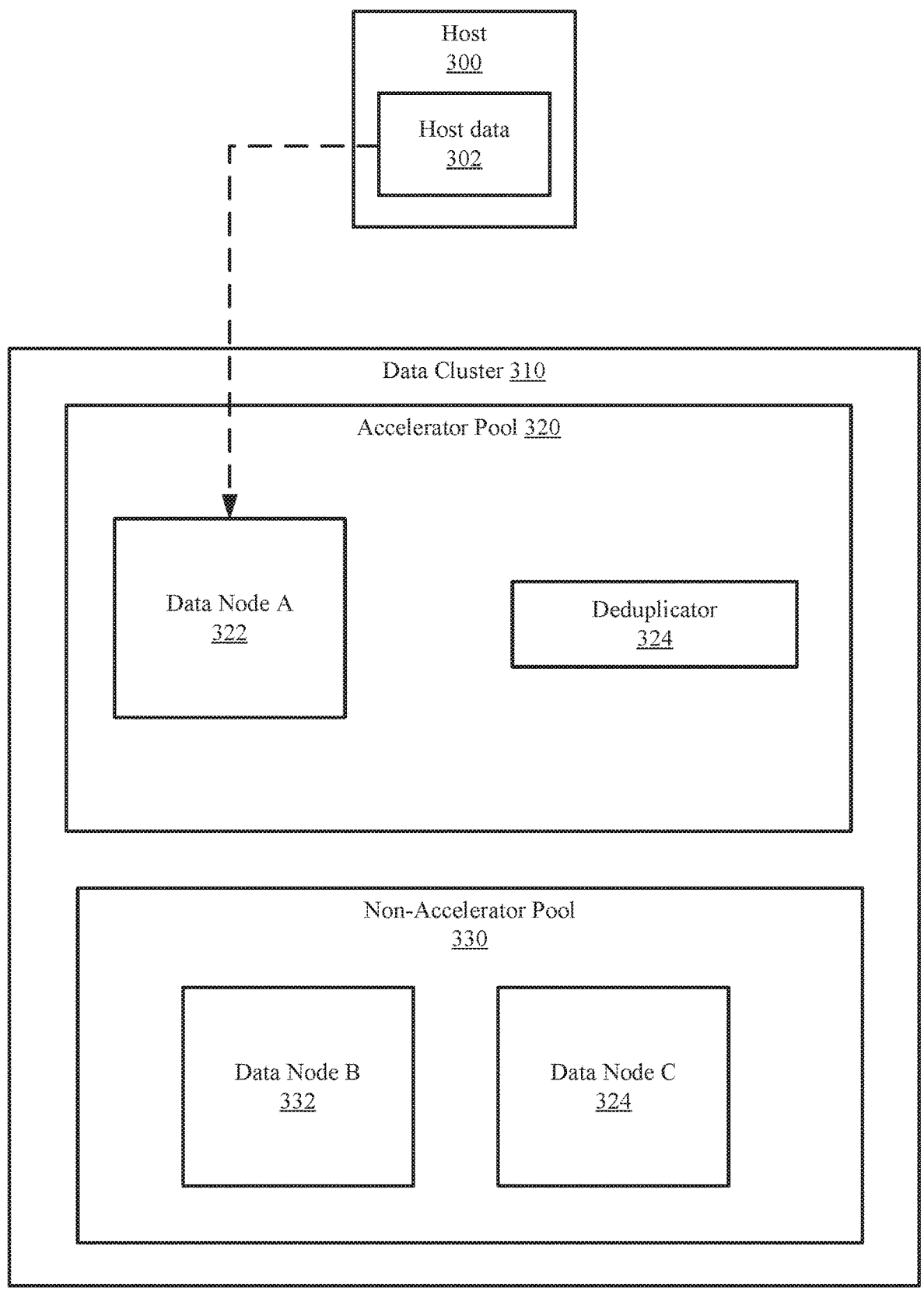
FIGS. 3B-3D show a second example in accordance with one or more embodiments of the invention.
Figure 3C:
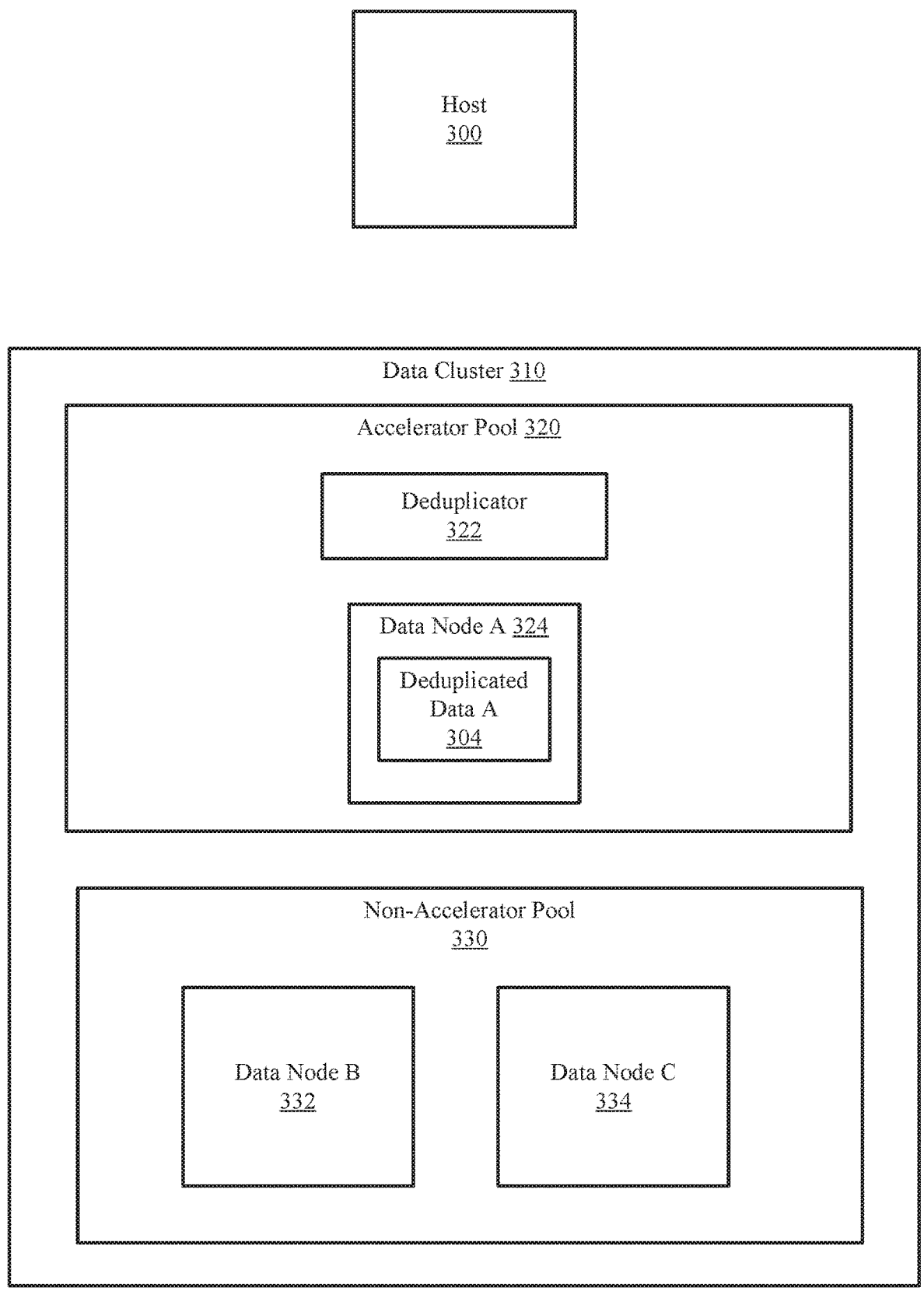
Figure 3D:
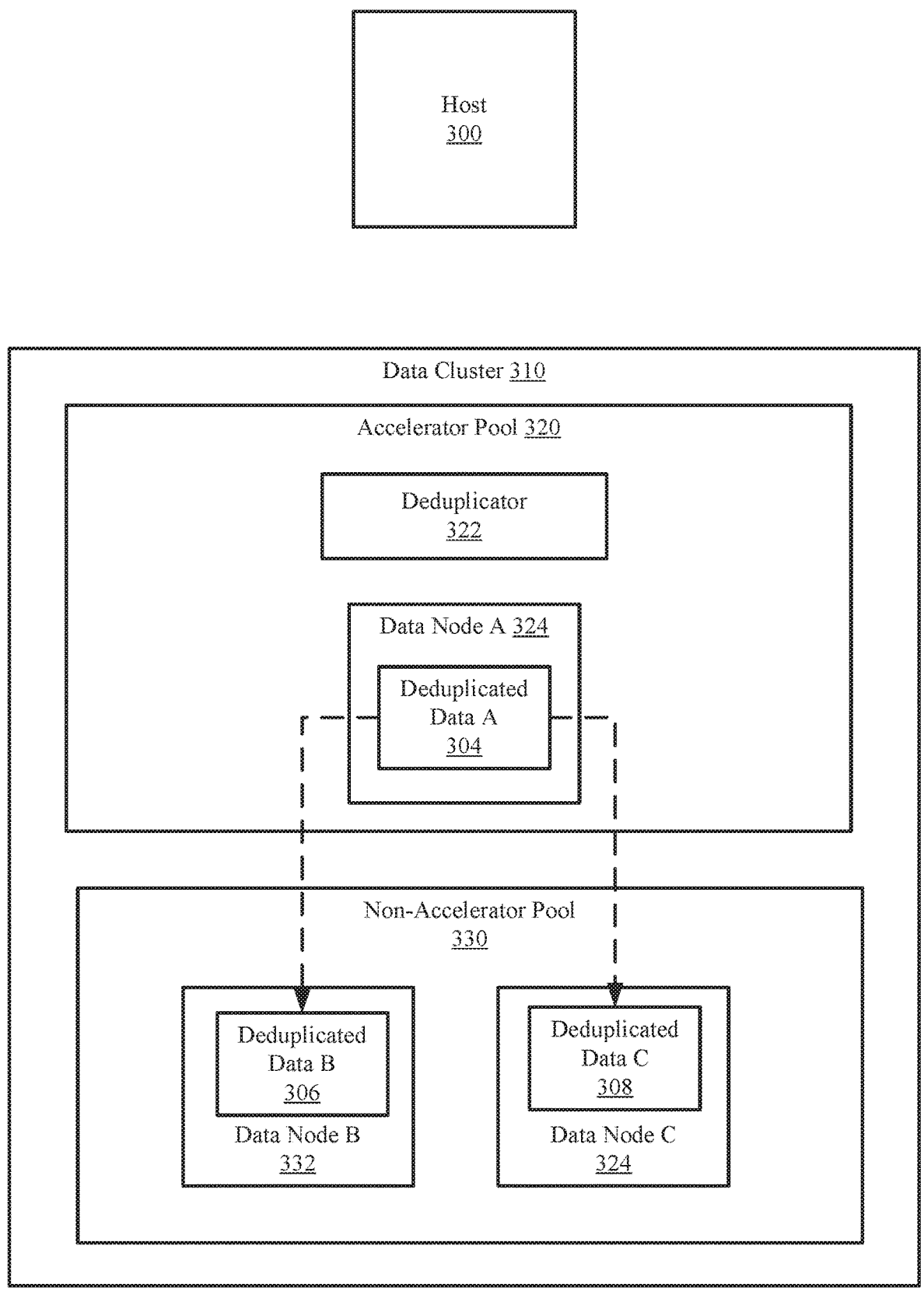

The following section describes an example. The example is not intended to limit the invention. The example is illustrated in FIGS. 3B-3D, with FIG. 3B showing an example system at a first point in time. Turning to the example, consider a scenario in which a host (300) wants to store deduplicated versions of host data (302) in a data cluster (310). The host (300) may send the host data (302) to a data node (322) operating on an accelerator pool (320).

The accelerator pool (320) may include a deduplicator (324) that may be utilized to perform the method of FIG. 3A to perform a deduplication on the host data (302). The process of deduplicating the host data (302) may include identifying data segments in the host data (302) and generating fingerprints of each data segment. For each generated fingerprint, the deduplicator (324) may search data stored in the deduplicator (324) to determine whether the generated fingerprint matches an existing fingerprint in the deduplicator (324). For every generated fingerprint matching an existing fingerprint, the data segment associated with the generated fingerprint may be deleted. In this manner, the result is deduplicated data with data segments not already stored in the data nodes (322, 332, 334) of the data cluster (310).

FIG. 3C shows the example system at a second point in time. In FIG. 3C, the deduplicated data (304) may be stored in the accelerator pool. The deduplicator (324) may continue the method of FIG. 3A to replicate the deduplicated data (304) to data nodes (332, 334) in the non-accelerator pool (330). The deduplicator (322) may determine a number of replicas to generate by obtaining the number from the host (300). The host may respond with a request that the deduplicated data (304) be replicated three times in the data cluster (310).

Because one of the three requested deduplicated data is already generated in this point in time, the deduplicator may replicate the deduplicated data (304) two more times. Data node A (324), which stores the first deduplicated data (304), may replicate the deduplicated data (304) to data nodes B and C (332, 334) in parallel. In other words, the data node (314) may generate and store a second deduplicated data and a third deduplicated data at the same time. Alternatively, the replicas may be generated and stored serially.

FIG. 3D shows the example system at a third point in time. At this third point in time, deduplicated data B (306) and C (308) may be stored in data nodes B (332) and C (334), respectively. Data node B (332) may be a node of a fault domain that is different from a fault domain in which data node C (334) is a part of. In this manner, if one of the two data nodes (332, 334) were to go through an unexpected shutdown, the other data node (332, 334) would not be affected, and the deduplicated data (e.g., 304, 306, 308) could still be accessed in the event of a recovery request by the host (300).

End of Example 2

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of performing storage and/or backup operations in a data cluster. The efficiency improvement may be achieved by performing deduplication on data prior to replicating the data to nodes in the data cluster. By deduplicating prior to replicating, the data cluster may reduce the amount of computing resources needed to perform replication over other systems that replicate the data prior to deduplication.

Further, embodiments of the invention improve the deduplication by upgrading the nodes performing a deduplication, i.e., performing the deduplication in the accelerator pool. The use of the higher-performance nodes in the accelerator pool may reduce processing time compared to non-high-performance nodes. This upgrade, along with performing the deduplication prior to replicating the data, may reduce the total amount of time required to store the data and reduces the total use of computing resources for a storage operation.

Thus, embodiments of the invention may address the problem of inefficient use of computing resources. This problem arises due to the technological nature of the environment in which storage operations are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
   receiving, by a first data node in a data cluster, a request to store data from a host;
   providing, by the first data node, the data to a deduplicator in the data cluster, wherein the deduplicator is operatively connected to the first data node;
   deduplicating, by the deduplicator in the data cluster, the data to obtain deduplicated data;
   storing, by the deduplicator, the deduplicated data on the first data node;
   after the deduplicated data is stored on the first data node:
      replicating, by the first data node, the deduplicated data to generate a plurality of replicas, wherein each of the plurality of replicas comprises a copy of the deduplicated data;
      initiating a storage of a first replica of the plurality of replicas to a second data node and a second replica of the plurality of replicas to a third data node,
      wherein the first data node, the second data node and the third data node are in the data cluster,
      wherein the first replica is stored on the second data node and the second replica is stored on the third data node in parallel,
      wherein the data cluster comprises an accelerator pool and a non-accelerator pool, and
      wherein the first data node and the deduplicator are in the accelerator pool and the second and third data nodes are in the non-accelerator pool.

2. The method of claim 1, further comprising:
   sending, in response to the request, a confirmation to the host that the request has been serviced.

3. The method of claim 1, further comprising:
   determining a number (N) of replicas to generate, wherein N is a positive integer greater than 2, and
   wherein replicating the deduplicated data to generate the plurality of replicas comprises generating N−1 replicas.

4. The method of claim 1, wherein the deduplicator is executing on a fourth data node in the data cluster.

5. A data cluster, comprising:
   a deduplicator;
   a plurality of data nodes comprising a first data node, a second data node, and a third data node;

wherein the deduplicator is programmed to:
  obtain data to deduplicate for the first data node;
  deduplicate the data to obtain deduplicated data; and
  providing the deduplicated data on the first data node,
wherein the first data node of the plurality of data nodes is programmed to:
  receive a request to store the data from a host;
  provide the data to the deduplicator, wherein the deduplicator is operatively connected to the first data node;
  receive the deduplicated data from the deduplicator;
  store the deduplicated data;
  after the deduplicated data is stored on the first data node:
    replicate the deduplicated data to generate a plurality of replicas, wherein each of the plurality of replicas comprises a copy of the deduplicated data;
    initiate storage of a first replica of the plurality of replicas on the second data node of the plurality of data nodes and a second replica of the plurality of replicas on the third data node of the plurality of data nodes, wherein the first replica is stored on the second data node and the second replica is stored on the third data node in parallel,
wherein the data cluster further comprises an accelerator pool and a non-accelerator pool, and
wherein the first data node and the deduplicator are in the accelerator pool and the second and third data nodes are in the non-accelerator pool.

6. The data cluster of claim 5, wherein the first data node is further programmed to:
  send, in response to the request, a confirmation to the host that the request has been serviced,
  wherein the confirmation is sent after the first replica is stored on the second data node and the second replica is stored on the third data node.

7. The data cluster of claim 5, wherein the first data node is further programmed to:
  determining a number (N) of replicas to generate, wherein N is a positive integer greater than 2, and
  replicating the deduplicated data to generate the plurality of replicas comprises generating N−1 replicas.

* * * * *